(12) United States Patent
Di Pardo et al.

(10) Patent No.: US 12,239,597 B2
(45) Date of Patent: Mar. 4, 2025

(54) SYSTEM FOR ASSISTING AN OPERATOR IN A WORK STATION

(71) Applicant: C.R.F. Società Consortile per Azioni, Orbassano (IT)

(72) Inventors: Massimo Di Pardo, Orbassano (IT); Francesca Gallo, Orbassano (IT)

(73) Assignee: C.R.F. Societá Consortile Per Azioni, Orbassano (IT)

( * ) Notice: Subject to any disclaimer, the term of this patent is extended or adjusted under 35 U.S.C. 154(b) by 475 days.

(21) Appl. No.: 17/190,967

(22) Filed: Mar. 3, 2021

(65) Prior Publication Data
US 2021/0330540 A1    Oct. 28, 2021

(30) Foreign Application Priority Data
Apr. 27, 2020    (EP) .................................... 20171569

(51) Int. Cl.
*A61H 3/00*    (2006.01)
*G06N 3/04*    (2023.01)
*G06N 3/08*    (2023.01)

(52) U.S. Cl.
CPC ................ *A61H 3/00* (2013.01); *G06N 3/04* (2013.01); *G06N 3/08* (2013.01);
(Continued)

(58) Field of Classification Search
CPC ................ A61H 3/00; A61H 2201/165; A61H 2201/1659; A61H 2201/5007;
(Continued)

(56) References Cited

U.S. PATENT DOCUMENTS 4,937,759 A * 6/1990 Vold .................... G05B 19/4061
700/262
5,155,423 A * 10/1992 Karlen ..................... B25J 9/046
318/568.1
(Continued)

FOREIGN PATENT DOCUMENTS

AU    2011237357 B2 * 11/2012 ............... A61F 2/54
WO    WO-2011127410 A2 * 10/2011 ............... A61F 2/54
(Continued)

OTHER PUBLICATIONS

"A methodology to develop collaborative robotic cyber physical systems for production environments", Azfar Khalid, et al., CrossMark, Logist. Res (2016) 9:23, DOI 10.1007/s12159-016-0151-x, pp. 1-15.
(Continued)

*Primary Examiner* — Timothy A Stanis
*Assistant Examiner* — Tyler A Raubenstraw
(74) *Attorney, Agent, or Firm* — Heslin Rothenberg Farley & Mesiti P.C.

(57)    ABSTRACT

A system for assisting an operator in a work station includes a collaborative robot, with a robot electronic controller, configured for conducting an operation in an open, non-protected space, adjacent and in cooperation with the operator, an exoskeleton including one or more actuators, wearable by the operator for receiving assistance in conducting one or more operations, a plurality of sensors associable to the body of the operator and configured for detecting at least one parameter. An electronic controller is configured for receiving signals by the sensors and for sending signals to the one or more actuators of the exoskeleton and to the robot controller based on an elaboration of signals received by the sensors, wherein the system controller is configured and programmed for dynamically controlling the exoskeleton and the robot so as to avoid collisions or injuries between the (Continued)

robot and the operator or conditions of lack of safety for the operator, and to enable the robot to cooperate with the operator by assuming positions suitable to the physical and physiological features, to the workload and to the postures of the operator.

12 Claims, 5 Drawing Sheets

(52) U.S. Cl.
CPC ............... *A61H 2201/165* (2013.01); *A61H 2201/1659* (2013.01); *A61H 2201/5007* (2013.01); *A61H 2201/5071* (2013.01); *A61H 2230/065* (2013.01); *A61H 2230/085* (2013.01); *A61H 2230/655* (2013.01)

(58) Field of Classification Search
CPC ...... A61H 2201/5071; A61H 2230/065; A61H 2230/085; A61H 2230/655; A61H 2003/001; A61H 2003/007; A61H 3/008; A61H 1/0262; A61H 2001/0211; A61H 2201/0211; G06N 3/08; G06N 3/04; B25J 9/0006; B25J 9/0003; B25J 9/16; B25J 13/089; B25J 9/00; B25J 9/06; B25J 9/0096

See application file for complete search history.

(56) References Cited

U.S. PATENT DOCUMENTS

| | | | |
|---|---|---|---|
| 9,211,642 B2 * | 12/2015 | Nammoto | B25J 9/1612 |
| 9,381,642 B2 * | 7/2016 | Asada | B25J 9/1694 |
| 9,789,023 B1 * | 10/2017 | Lee | A61H 3/00 |
| 9,833,896 B2 * | 12/2017 | Kim | A61H 3/00 |
| 9,844,447 B2 * | 12/2017 | van der Merwe | A61F 2/588 |
| 10,434,030 B2 * | 10/2019 | Asbeck | A61H 3/00 |
| 10,702,440 B2 * | 7/2020 | Kim | A61F 2/70 |
| 10,766,137 B1 * | 9/2020 | Porter | G06N 3/04 |
| 10,906,180 B1 * | 2/2021 | Chefitz | B25J 11/009 |
| 11,213,952 B2 * | 1/2022 | Tsuneta | B25J 9/06 |
| 11,305,424 B2 * | 4/2022 | Yamane | B25J 9/1633 |
| 2006/0206167 A1 * | 9/2006 | Flaherty | A61H 3/008 607/48 |
| 2012/0259431 A1 * | 10/2012 | Han | A61H 1/024 623/24 |
| 2014/0358290 A1 * | 12/2014 | Kazerooni | G06F 3/011 700/275 |
| 2015/0120127 A1 * | 4/2015 | Shikina | G05D 1/0236 701/28 |
| 2018/0065246 A1 * | 3/2018 | Mullen | B25J 9/161 |
| 2018/0116828 A1 * | 5/2018 | Quinn | B25J 9/0006 |
| 2018/0224862 A1 * | 8/2018 | Akazawa | A47L 9/2852 |
| 2018/0236308 A1 * | 8/2018 | Hyde | G09B 19/0038 |
| 2018/0257216 A1 * | 9/2018 | Shavit | A61H 1/0262 |
| 2019/0029914 A1 * | 1/2019 | Polygerinos | A63B 23/0494 |
| 2019/0069957 A1 * | 3/2019 | Barral | A61B 34/20 |
| 2019/0099877 A1 * | 4/2019 | Goehlich | A61H 3/00 |
| 2019/0183715 A1 * | 6/2019 | Kapure | G16H 50/20 |
| 2019/0193951 A1 * | 6/2019 | Iwasaki | B65G 1/137 |
| 2019/0343707 A1 * | 11/2019 | Riener | A61H 1/0281 |
| 2019/0358074 A1 * | 11/2019 | Zelik | F16D 13/58 |
| 2019/0358807 A1 * | 11/2019 | Ohta | A61H 1/0244 |
| 2020/0037926 A1 * | 2/2020 | Tomczak | A61B 5/112 |
| 2020/0061839 A1 * | 2/2020 | Deyle | G06Q 10/087 |
| 2020/0114506 A1 * | 4/2020 | Toshev | G06N 3/008 |
| 2020/0121556 A1 * | 4/2020 | Tian | A61H 39/02 |
| 2020/0163782 A1 * | 5/2020 | McDonald | A61H 1/0277 |
| 2020/0179213 A1 * | 6/2020 | Krumholz | A61H 1/0274 |
| 2020/0179215 A1 * | 6/2020 | Lerner | A61H 1/0244 |
| 2020/0206062 A1 * | 7/2020 | Kim | B25J 9/0006 |
| 2020/0206913 A1 * | 7/2020 | Kaehler | G06F 18/24 |
| 2020/0223071 A1 * | 7/2020 | Mahoney | A63B 21/00181 |
| 2020/0254609 A1 * | 8/2020 | Claussen | B25J 9/1661 |
| 2020/0281799 A1 * | 9/2020 | Geffard | A61H 3/00 |
| 2020/0338722 A1 * | 10/2020 | Jang | G06N 3/08 |
| 2020/0346342 A1 * | 11/2020 | Siegert | B25J 9/1669 |
| 2021/0060790 A1 * | 3/2021 | Semsar | G06V 10/82 |
| 2021/0338351 A1 * | 11/2021 | Blondel | A61B 34/25 |
| 2021/0362322 A1 * | 11/2021 | Geffard | B25J 9/0081 |
| 2021/0394356 A1 * | 12/2021 | Beckman | B25J 13/02 |

FOREIGN PATENT DOCUMENTS

| | | | | |
|---|---|---|---|---|
| WO | WO-2020118148 A2 * | 6/2020 | | |
| WO | WO-2021191784 A1 * | 9/2021 | | A61B 5/11 |

OTHER PUBLICATIONS

European Search Report dated Sep. 29, 2020.

* cited by examiner

SYSTEM FOR ASSISTING AN OPERATOR IN A WORK STATION

CROSS REFERENCE TO RELATED APPLICATIONS

This application claims priority from European Patent Application No. 20171569.5 filed on Apr. 27, 2020, the entire disclosure of which is incorporated herein by reference.

TECHNICAL FIELD

The present invention relates to a system for assisting an operator in a work station.

PRIOR ART

Apparatus for assisting operators in work stations in conducting their operations has been known and used for some time.

Such assistance apparatus include, for instance, collaborative robots capable of assisting operators in conducting operations or conducting part of the workload themselves, and exoskeletons wearable by operators in order to receive an effect of assistance in maintaining postures wherein the muscular apparatus of the operator is under strain for prolonged periods of time.

There has recently been an interest in the development of systems where such assistance apparatus are controlled so as to cooperate with each other in order to optimize the working conditions of the operator receiving assistance from them.

An example of such systems is described in the US patent application US 2019099877 A1, which relates to an exoskeleton wearable by an operator in a work station. In an embodiment, an electronic control unit that communicates with an external robot and sends command signals to the exoskeleton is associated to the exoskeleton so as to prevent the risk of accidental collisions between the operator wearing it and the robot.

However, this system is not very functional and is uncomfortable for the operator wearing the exoskeleton, as the prevention of collisions between the operator and the external robot is carried out by the electronic control unit by detecting the position of the robot and consequently controlling movements of the exoskeleton.

Furthermore, although this system is effective in preventing collisions between the operator and the external robot, it is limited to this function, without providing for any active cooperation between the robot and the exoskeleton in assisting the operator in conducting his/her operations.

The need therefore remains for systems that are more comfortable for the operator, and wherein the assistance apparatus actively cooperate with each other for relieving the efforts of the operator and safeguarding his/her health, while at the same time achieving an increase in efficiency and productivity, thanks to an effective division of tasks between operator and robot.

OBJECT OF THE INVENTION

An object of the present invention is therefore to implement a system of the type mentioned at the beginning of the present description wherein the assistance apparatus actively cooperate with each other in order both to alleviate the efforts of the operator and safeguard his/her health and also to enable the operator to operate more efficiently.

A further object of the present invention is to implement a system of the type above mentioned, which is comfortable for the operator.

A further object of the present invention is to implement a system of the type above mentioned, wherein the collaborative activity of the robot is able to automatically and dynamically adapt to the physical and physiological features of the operator in all conditions of use of the system.

SUMMARY OF THE INVENTION

In view of achieving one or more of the abovementioned objectives, the invention relates to a system for assisting an operator in a work station, the system comprising:
- at least one collaborative robot configured for conducting one or more operations in an open, non-protected space, adjacent to an operator and in cooperation with the operator, with a robot electronic controller associated to the at least one collaborative robot,
- at least one active exoskeleton including one or more electrically operated actuators, wearable by an operator for receiving assistance in conducting one or more operations,
- a plurality of sensors associable to the body of the operator and configured for detecting at least one parameter selected from heart rate, metabolic consumption, skin conductivity, surface electromyography, pressure at the interface between the active exoskeleton and the body of the operator, movement of the operator and relative orientation of the body districts of the operator,
- at least one system electronic controller configured for receiving signals by the plurality of sensors and for sending signals to the one or more actuators of the at least one active exoskeleton and to the robot electronic controller based on an elaboration of signals received from the plurality of sensors,
- wherein the system electronic controller is configured and programmed for dynamically controlling the functioning of the one or more actuators of the at least one active exoskeleton and the functioning of the at least one collaborative robot as a function of parameters detected by the plurality of sensors so as to avoid collisions or injuries between the collaborative robot and the operator or conditions of lack of safety for the operator, and so as to enable the collaborative robot to cooperate with the operator by assuming positions suited to the physical and physiological features, to the workload and to the postures of the operator.

The detection of the above-mentioned physiological parameters by the plurality of sensors allows to detect the fatigue level of the operator during the work activity, so the system electronic controller controls the active exoskeleton and the collaborative robot so that they provide for an assistance consistent with the fatigue level of the operator. The detection of the parameters of movement and of relative orientation of the body districts of the operator by the plurality of sensors allows the system electronic controller to control the position of the collaborative robot so that the risk of collisions between the operator and the collaborative robot is reduced and that the work station is safer and more comfortable.

In an embodiment, at least some of the sensors are associable to the at least one active exoskeleton so as to be in contact with the body of the operator, with reference to the worn condition of the at least one active exoskeleton.

In an embodiment, at least some of the sensors are associable to a garment intended to be worn by the operator, and wherein the at least one active exoskeleton is worn by the operator over such garment.

In an embodiment, at least some of the sensors are associable directly to the body of the operator.

Preferably, at least some of the sensors are associable to the body of the operator at least one body district of the operator selected from arms, legs and torso.

In the preferred embodiment, the at least one active exoskeleton comprises:
- an upper structure for the engagement of the torso of the operator and a lower structure for the engagement of the legs of the operator,
- the upper structure and the lower structure being pivotally connected to each other around an axis,
- at least one elastic device operatively interposed between the upper structure and the lower structure,
- at least one electric motor operatively arranged in series with the at least one elastic device, between the upper structure and the lower structure, and actionable by the system electronic controller for dynamically controlling the extent of deformation of the at least one elastic device.

Preferably, the at least one elastic device is selected from a spiral spring and an elastic joint.

In an embodiment, the at least one system electronic controller comprises an artificial neural network configured for learning the movements and the physical and physiological features of the operator and for consequently elaborating both signals to send to the robot controller for allowing the collaborative robot to operate in a manner consistent with the movements and the physical and physiological features of the operator and command signals for the one or more actuators of the at least one active exoskeleton.

In this way, the system electronic controller stores the parameters detected by the plurality of sensors for a specific operator and the type of control which is set on the collaborative robot and on the active exoskeleton based on such parameters. Therefore, when the assistance system is used by several different operators, the system electronic controller stores the parameters detected by the plurality of sensors and the optimal control of the collaborative robot and of the active exoskeleton for each individual operator. This makes it easier for the system electronic controller to provide the specific operator who is using the assistance system at that time with an optimal assistance.

DETAILED DESCRIPTION OF THE INVENTION

Further characteristics and advantages of the invention will become apparent from the description that follows with reference to the attached drawings, provided purely by way of non-limiting example, wherein.

Figure 1:
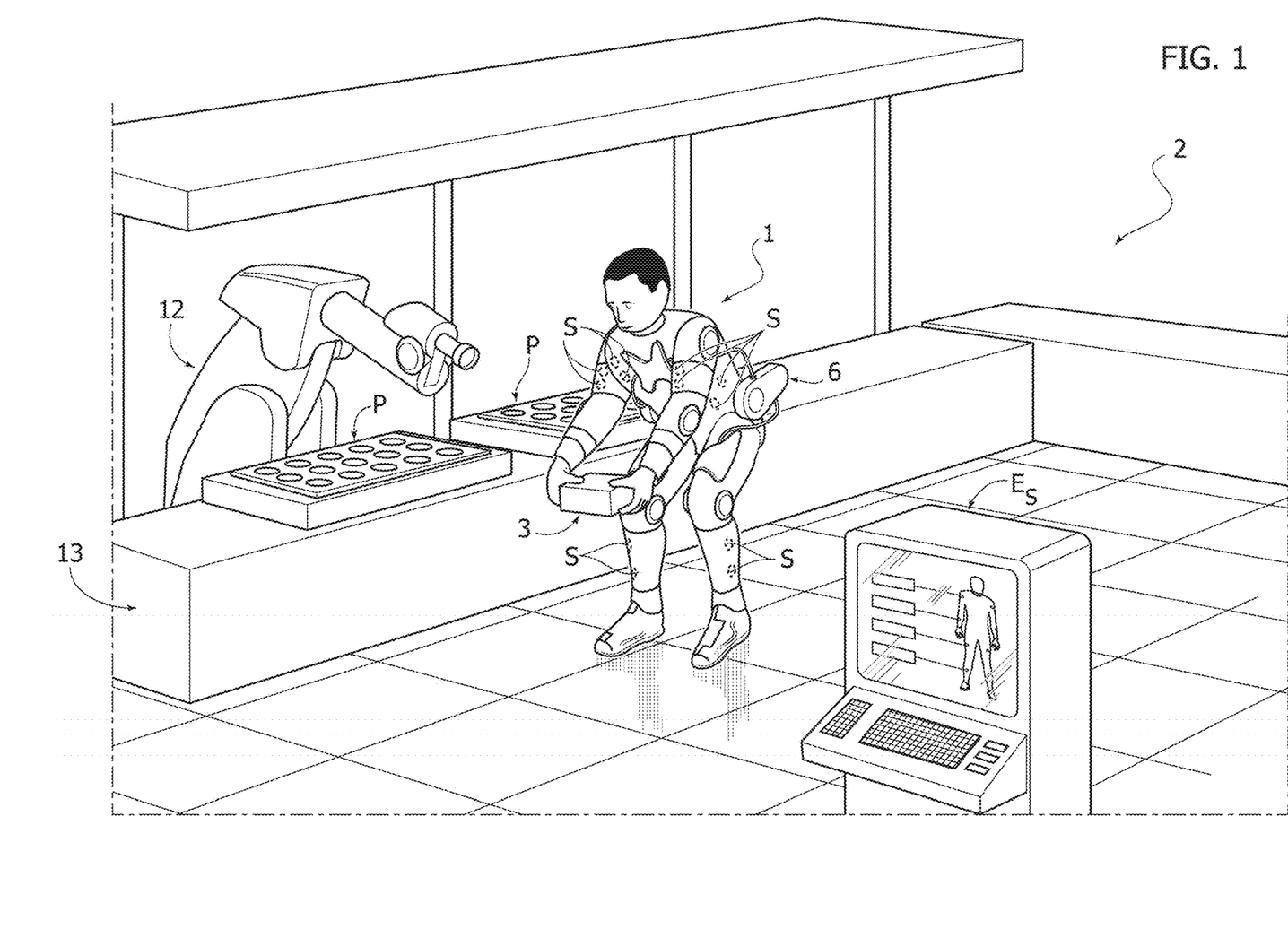
FIG. 1 is a perspective view of a work station wherein an operator who receives assistance from the system subject of the present invention is located.

In FIG. 1, numeral 1 indicates in its entirety an operator who conducts his/her working operations within a work station, referenced by numeral 2. Thanks to the characteristics of the system which is here described, the work station 2 can be an open, fenceless space within a factory.

In the example illustrated in FIG. 1, the operator 1 is intent on lifting a workpiece 3, but it is understood that the operator 1 may be engaged in conducting any type of operation required within a work station 2.

The work station 2 comprises a system for assisting the operator 1 in conducting the working operation, so as to minimize his/her fatigue level and to optimize his/her work performance.

In particular, this system comprises a plurality of sensors S associable to the body of the operator 1 for the detection of one or more parameters.

The sensors S are configured for detecting one or more physiological parameters, which are indicative of the fatigue level of the operator 1, and/or one or more movement parameters, which are indicative of the position and of the orientation of the operator 1 in the work station 2.

Examples of parameters which are detected by sensors S are the heart rate, the metabolic consumption, the skin conductivity, the surface electromyography, the pressure at the interface between an active exoskeleton worn by the operator 1 and the body of the operator 1, the movement of the operator 1 and the relative orientation of the body districts of the operator 1. It is understood that it is possible to carry out detections in which the above parameters are detected all together, individually or in groups.

It is understood that the number, the type and the shape of the sensors S which are associated to the body of the operator 1 may vary in different embodiments, based also on parameters which are intended to be detected. For instance, if you want to perform a surface electromyography for detecting the activation of the muscles of the operator 1 or a detection of the heart rate of the operator 1, the sensors consist of electrodes usually used in the art for this type of detections.

In an embodiment, the sensors S are associated to a garment 4 intended to be worn by an operator 1, so that when the operator 1 wears the garment, the sensors S are in contact with the body of the operator 1.

Figure 2:
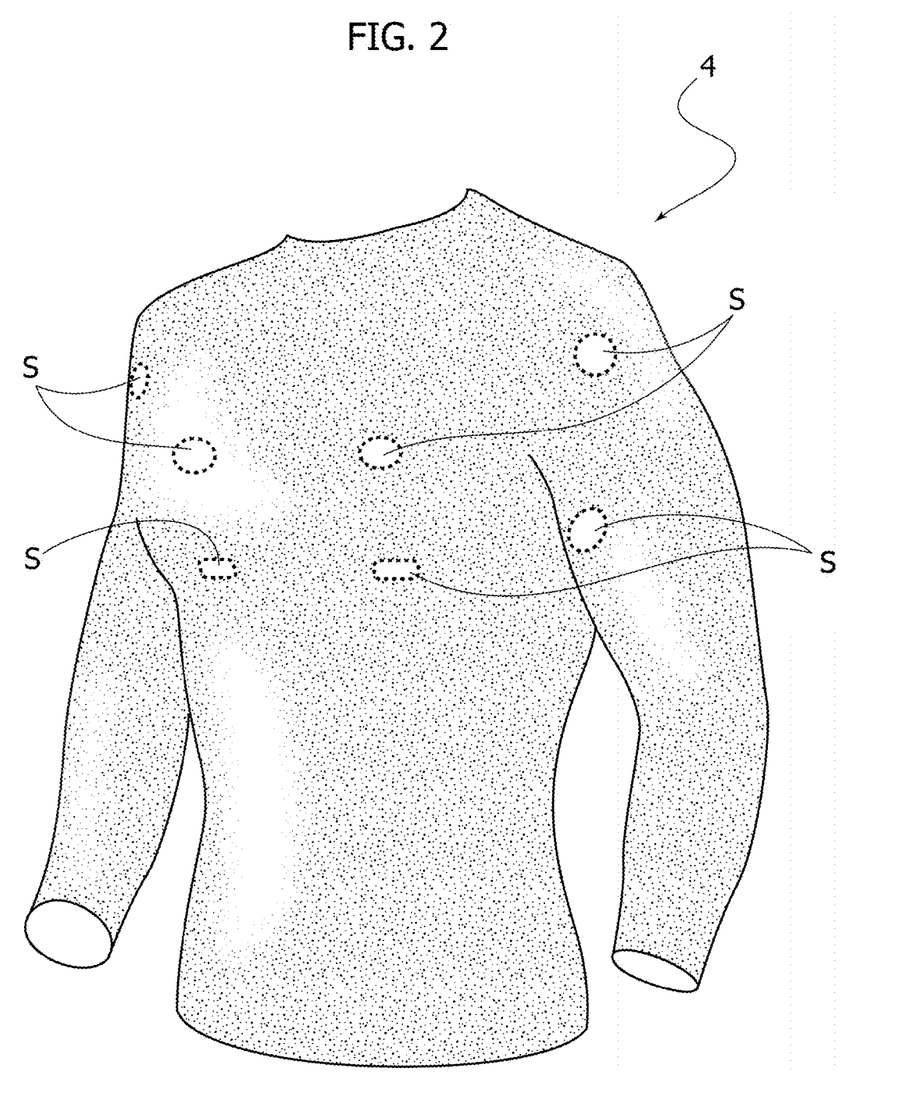
FIG. 2 is a perspective view of a garment comprising suitable sensors for the detection of parameters from the operator.

In the example shown in FIG. 2, such garment 4 is a shirt. However, it is understood that such example is non-limiting, since also embodiments wherein the sensors S are associated to garments 4 other than a shirt, for example a tracksuit as shown in FIG. 5, fall under the scope defined by the present description.

In the example shown in FIG. 2, the sensors S are of a substantially circular or elliptic shape, and are arranged at the areas of the shirt intended to be in contact with the chest and with the arms of the operator 1 wearing the shirt.

Figure 5:
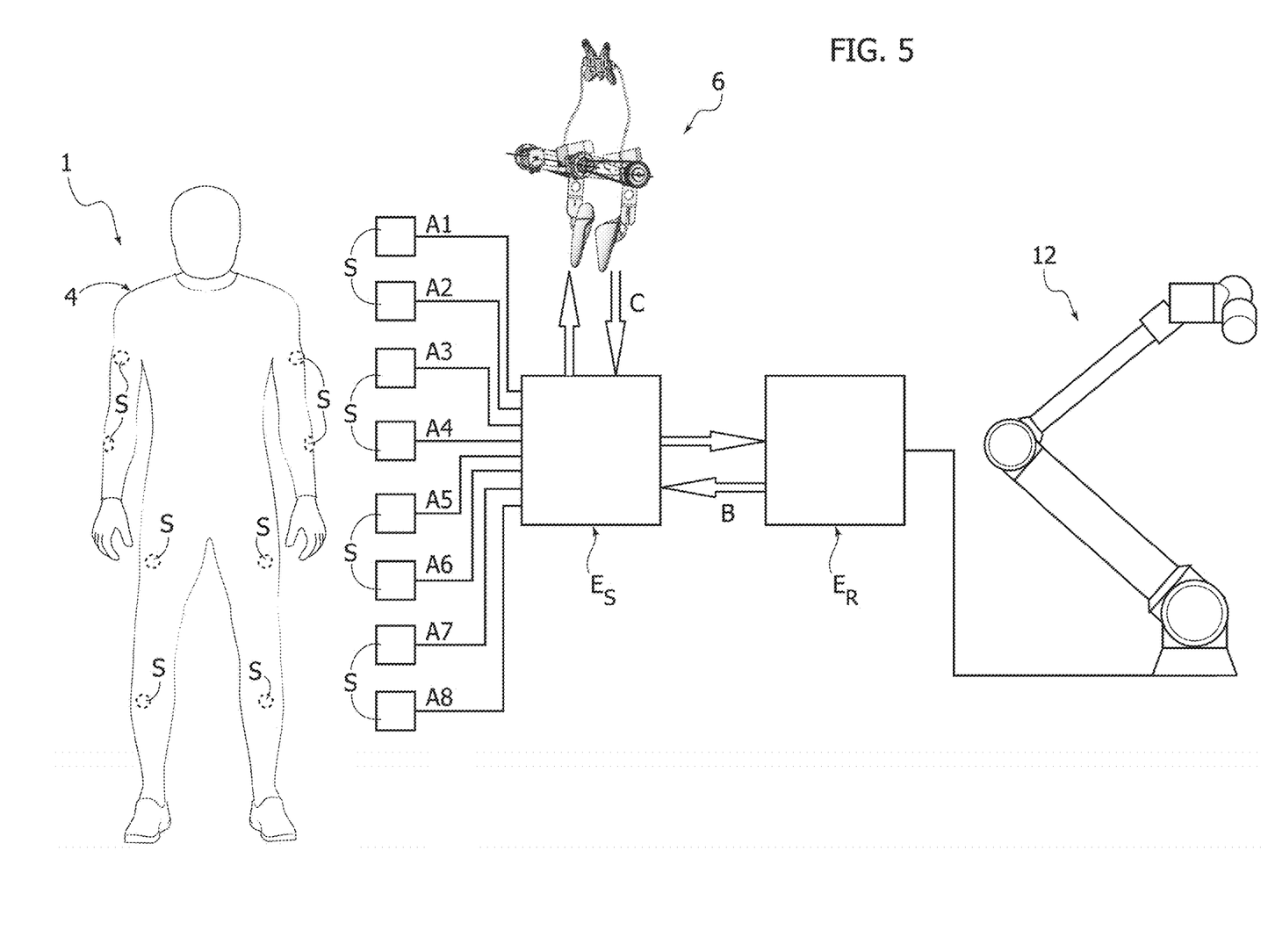
FIG. 5 is a schematic representation of the functioning of the system subject of the present invention.

Nevertheless, such characteristics are non-limiting, since the sensors S may also be of shape and size other than the ones represented in FIG. 2 and may be arranged in areas of the shirt intended to be in contact with other body districts of the operator 1, such as for instance the forearm, the abdomen, the back and, if the garment 4 to which the sensors S are associated is a tracksuit, the legs, as shown in FIG. 5.

Figure 3:
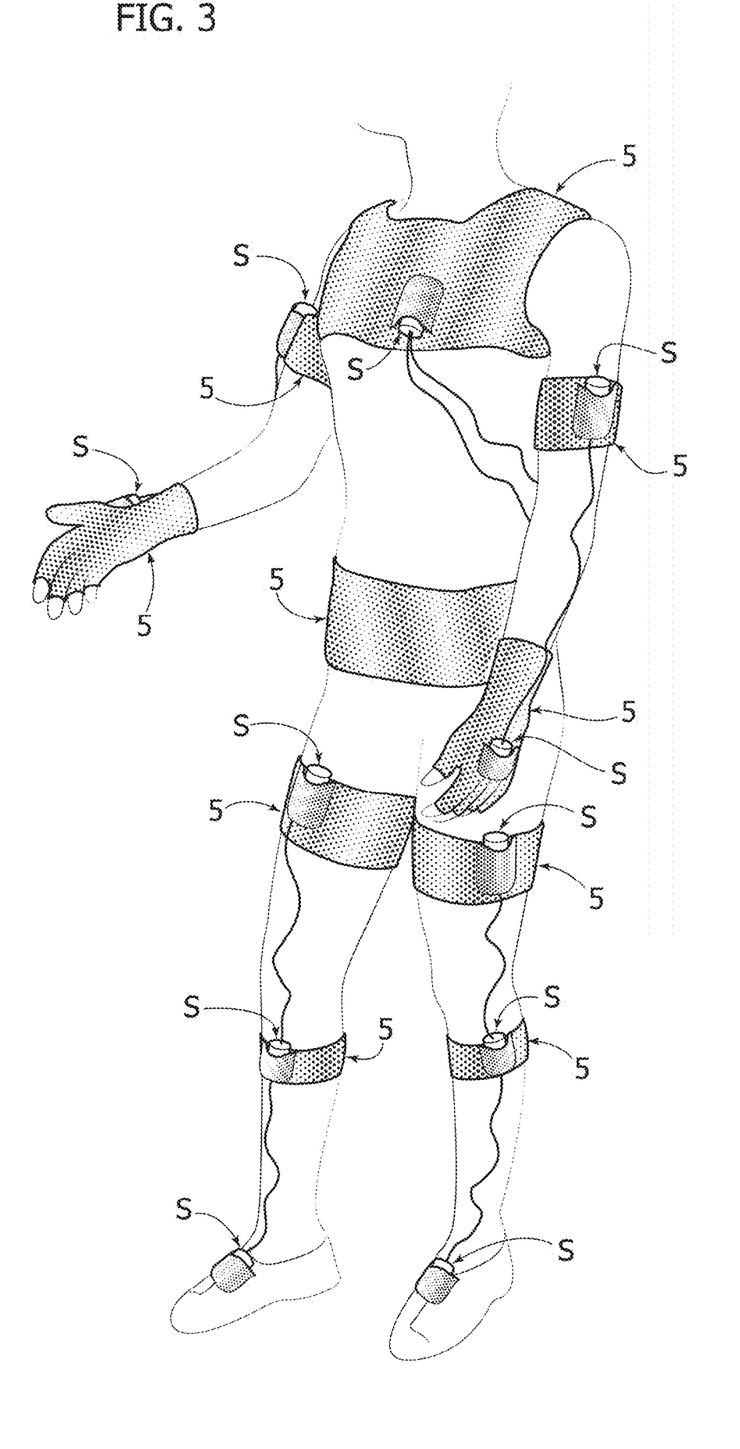
FIG. 3 is a perspective view of an operator having a plurality of sensors in contact with the body.

In an embodiment, the sensors S are associated directly to the body of the operator 1, as represented by way of example in FIG. 3.

In the example shown in FIG. 3, the sensors S are arranged at the torso, the arms, the hands, the legs and the feet of the operator 1. This characteristic is non-limiting, since it is possible that in other embodiments the sensors S are arranged also at body districts of the operator 1 different than shown in FIG. 3, for instance at the abdomen, the forearm or the neck of the operator 1.

In the embodiment shown in FIG. 3, the sensors S are supported in pockets of support structures 5, which are used to keep the sensors S stationary at the body district where the detection of the parameter or of the parameters of interest is intended to be conducted.

In the example shown in FIG. 3, the support structures 5 are portions of fabric shaped so that they can be worn at the various body districts of the operator 1. It is understood that the shape of the support structures 5 may also be different than the one shown in FIG. 3, being suitable any type of shape capable of keeping the sensors S in the desired position and in contact with the body of the operator 1.

Moreover, in embodiments not visible in the figures, the support structures 5 are absent, as the sensors S are capable of remaining autonomously at the suitable body district for detecting the parameters. For example, in the case a surface electromyography or the detection of the heart rate of the operator 1 is intended to be conducted, electrodes can be used that include an adhesive strip at the portion that comes into contact with the body of the operator 1, capable of keeping the electrode attached to the skin, so that support structures 5 are not required.

It is evident from the above description that the preferred body districts of the operator 1 with which the sensors S are put in contact for conducting the detections of parameters are the arms, the legs and the torso. However, this characteristic is non-limiting, since the sensors S may be arranged at any other body district of the operator 1 in which the detection of one or more parameters is intended to be conducted.

The system for assisting the operator 1 in the work station 2 further comprises at least one active exoskeleton 6, wherein "active exoskeleton" refers to an exoskeleton comprising one or more electrically operated actuators. The active exoskeleton 6 is wearable by the operator 1 for receiving assistance in the execution of one or more operations and, preferably, for receiving assistance in maintaining postures in which the muscles of the operator 1 are contracted for prolonged periods of time.

It is understood that both embodiments wherein the system comprises only one active exoskeleton 6 and embodiments wherein the system comprises more than one active exoskeleton 6, each for providing a corresponding body district of the operator 1 who is wearing them with support, fall under the scope of the present description. In the embodiment wherein the system comprises more than one active exoskeleton 6, each active exoskeleton 6 comprises one or more corresponding electrically operated actuators.

In a preferred embodiment, the active exoskeleton 6 is worn by the operator 1 for receiving assistance in forward reclining movements of the torso, and is particularly useful when the operator 1 has to remain for many hours in a row with the torso forward reclined or when the operator 1 has to perform tasks, such as lifting weights, in the reclined position, as exemplified in FIG. 1.

However, this characteristic is non-limiting, since in embodiments not visible in the figures the active exoskeleton 6 provides the operator 1 with a different support, for example a support to movements of the muscles of the legs or to movements of the muscles of the arms.

Figure 4:
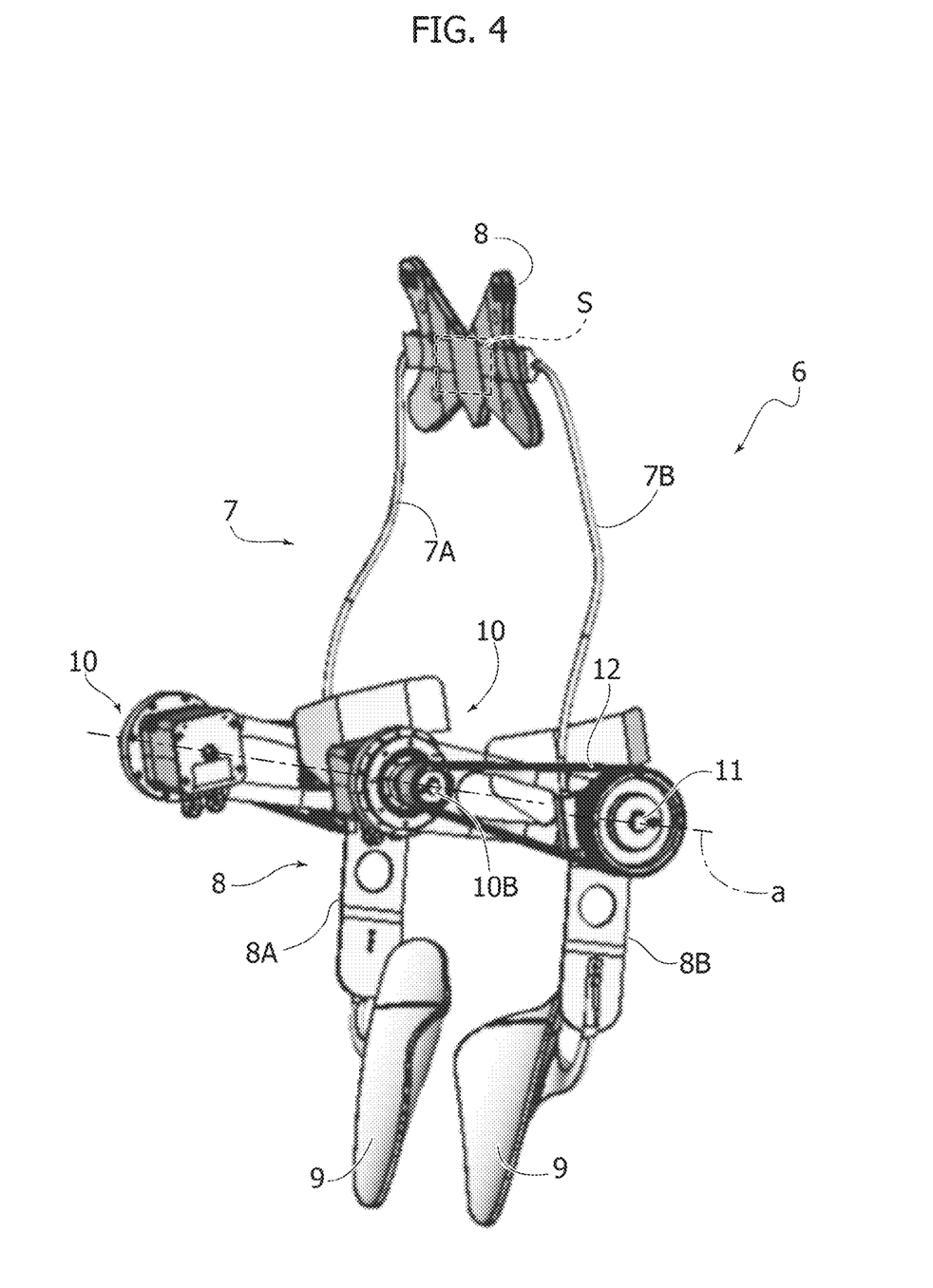
FIG. 4 is a perspective view of a preferred example of an active exoskeleton comprised in the system subject of the present invention.

A preferred example of active exoskeleton 6 suitable for being worn by an operator 1 has already been proposed by the same inventors in the European patent application EP 20162846, still secret at the date of filing of the present application, and is shown in FIG. 4.

In this preferred example, the active exoskeleton 6 is worn by the operator 1 for receiving assistance in forward reclining movements of the torso, and comprises an upper structure 7, for the engagement of the torso of the operator 1, and a lower structure 8, for the engagement of the legs of the operator 1. The upper structure 7 and the lower structure 8 are pivotally connected with each other around an axis a.

As visible in FIG. 4, the upper structure 7 comprises a pair of lateral uprights 7A and 7B joint at the top by a panel 8, provided for the support of the torso of the operator 1 wearing the active exoskeleton 6, while the lower structure 8 comprises two lower lateral semi-structures 8A and 8B, intended to be associated to each leg of the operator 1 respectively. In the embodiment shown, each of the two lower lateral semi-structures 8A and 8B carries a panel 9 of support for the leg of the operator 1.

The active exoskeleton 6 further comprises at least one elastic device, not visible in FIG. 4, preferably a spiral spring or an elastic joint, operatively interposed between the upper structure 7 and the lower structure 8, and at least one electric motor 10 operatively arranged in series with the elastic device, between the upper structure 7 and the lower structure 8.

The electric motor 10 comprises a motor shaft 10B, capable of driving the rotation of a driven shaft 11 by means of a belt reducer transmission 12. Being the driven shaft 11 linked to the elastic device, such elastic device is deformed by the rotation and consequently delivers a resisting torque which results in a supporting effect felt by the operator 1 in the forward reclining movement of the torso.

In an embodiment, the sensors S are associated to the structure of the active exoskeleton 6 so as to be in contact with the body of the operator 1, with reference to the condition of the active exoskeleton 6 worn by the operator 1. The association between the sensors S and the active exoskeleton 6 may be performed in any type know in the art, for example by means of the use of an adhesive material.

In the embodiment wherein the active exoskeleton 6 is the exoskeleton shown in FIG. 4, the sensors S are preferably arranged at the panel 8 and/or the panels 9.

In the embodiment wherein the operator 1 wears a garment 4 in which the sensors S are integrated, the active exoskeleton 6 is worn by the operator 1 over the garment 4.

The system for assisting the operator 1 in conducting work operations further comprises at least one collaborative robot 12, configured for conducting one or more operations adjacent to the operator 1 and in cooperation with the operator 1, wherein "collaborative robot" refers to a robot operating in an open space not protected by a fence or other means of protection. In other words, the collaborative robot 12 operates in the same work station 2 where the operator 1 conducts his/her operations.

The collaborative robot 12 is configured for cooperating with the operator 1 in order to facilitate the conduction of his/her operations, for example by providing him/her with tools necessary for the work or by conducting actions complementary to the actions conducted by the operator 1. FIG. 1 is exemplificative of a situation in which the collaborative robot 12 and the operator 1 conduct complementary operations on products P to be worked which are arranged on a worktop 13 within the work station 2.

The collaborative robot 12 further comprises a robot electronic controller $E_R$ associated to it. In particular, the electronic controller $E_R$ sends signals to the collaborative robot 12 so as to control the actions which are conducted by the collaborative robot 12 or the position of the collaborative robot 12 within the work station 2.

It is understood that more than one collaborative robot 12 may be present in the work station 2 for cooperating with the operator 1. In such a case, each collaborative robot 12 is associated to a corresponding robot electronic controller $E_R$.

It is understood that the collaborative robot 12 may be any type of collaborative robot known in the art and suitable for being used in a work station 2. Typical examples of collaborative robots are robots equipped with sensorized coatings or casings, which allow the robot to stop when an excessive proximity of parts of the robot with respect to an external body is detected.

The system for assisting the operator 1 further comprises at least one system electronic controller $E_S$ configured and programmed for receiving signals by the sensors S, which are elaborated by them based on the parameters detected from the operator 1, and for sending signals to the one or more electrically operated actuators of the active exoskeleton 6 and to the robot electronic controller $E_R$ based on the elaboration of signals detected by the sensors S.

In particular, the electrically operated actuators of the active exoskeleton 6 worn by the operator 1 are controlled by the system electronic controller $E_S$ based on the physiological parameters detected by the sensors S which are indicative of the fatigue level of the operator 1, such as the heart rate, the surface electromyography, the skin conductivity and the metabolic consumption.

Moreover, the robot electronic controller $E_R$ is controlled by the system electronic controller $E_S$ based on the parameters indicative of the movement of the operator 1 and on the position and relative orientation of his/her body districts. In this way, the electronic controller $E_R$ moves the collaborative robot 12 so that the operator 1 does not risk to collide with it and always operates safely.

In the preferred embodiment, the system electronic controller $E_S$ advantageously comprises an artificial neural network configured for learning the movements and the physical and physiological features of the operator 1 and for consequently elaborating both signals to send to the robot electronic controller $E_R$ and command signals for the electrically operated actuators of the active exoskeleton 6. It is understood that the definition "artificial neural network" as used herein refers to a circuit or a controller configured for performing an elaboration by means of a method of machine learning.

A scheme of the use of the embodiment shown in the figures is visible in FIG. 5. The operator 1 who works within the work station 2 wears the garment 4 in which the sensors S are integrated which, in the worn condition, are in contact with the body of the operator 1. Over the garment 4, the operator 1 wears the active exoskeleton 6 (not visible on the operator 1 in FIG. 5, for allowing the visualization of the garment 4), in order to receive support in maintaining the postures in which the muscles are contracted for prolonged times. The collaborative robot 12, which cooperates with the operator 1 in conducting his/her work operations, is also present in the work station 2.

The sensors S detect physiological parameters of the operator 1, namely heart rate, skin conductivity, surface electromyography, metabolic consumption, which are indicative of the fatigue level of the operator 1, and parameters indicative of the movement and of the relative orientation of the body districts of the operator 1.

Based on the detected parameters, the sensors S generate a plurality of signals, indicated as A1-A8 in FIG. 5, and send them to the system electronic controller $E_S$. Based on the signals received by the sensors S, the system electronic controller $E_S$ sends one or more signals B to the robot electronic controller $E_R$, associated to the collaborative robot 12, and one or more signals C to the electrically operated actuators of the active exoskeleton 6.

Based on the signals B received from the system electronic controller $E_S$, the robot electronic controller $E_R$ controls the collaborative robot 12 so that it cooperates in an optimal way with the operator 1. In particular, the robot electronic controller $E_R$ commands movements of the collaborative robot 12 within the work station 2 so as to avoid that it collides with the operator 1, thus ensuring safe work conditions and reducing the risk that the operator 1 is accidentally injured. Moreover, the robot electronic controller $E_R$ controls the collaborative robot 12 so that it conducts complementary operations to the operations conducted by the operator 1. For example, the collaborative robot 12 may deliver work tools to the operator 1, or conduct part of the workload of the operator 1.

Moreover, based on signals C received by the system electronic controller $E_S$, the electrically operated actuators of the active exoskeleton 6 are activated, deactivated or regulated so as to provide the operator 1 wearing the active exoskeleton 6 always with the optimal assistance, which is set based on the fatigue level detected with the elaboration of the parameters detected by the sensors S.

Thanks to the presence of the artificial neural network, the system electronic controller $E_S$ stores the physiological parameters and the movement parameters detected for every operator 1 who uses the assistance system, and elaborates these parameters by means of methods of machine learning. As a consequence, an optimal control of the collaborative robot 12 and of the active exoskeleton 6 is set for every operator 1, so as to receive an assistance that is as adapted as possible to the physical and physiological features, to the postures and to the workload of the operator 1, and as a function of the time and of the evolution of the physical state of the operator 1 during the working period.

For example, depending on the height of the operator 1, the artificial neural network is capable of storing the optimal position for the delivery of working tools from the collaborative robot 12 to the operator 1, so that every time that specific operator 1 uses the assistance system within the work station 2, the collaborative robot 12 delivers the working tools to the operator 1 at the stored position.

It is evident form the above description that the assistance system subject of the present invention is characterized by a high level of active cooperation among the involved apparatus. In fact, the system allows not only to avoid that the operator collides with the collaborative robot, but also to foster an active cooperation between the collaborative robot and the active exoskeleton so as to maximize the assistance felt by the operator and to make the working environment comfortable and safe.

Moreover, unlike what has been described in the US patent application US 2019099877 A1 cited at the beginning of the present description, collisions between the collaborative robot and the operator are prevented not by moving the exoskeleton—and thus the muscles of the operators—against the control of the operator, but simply by moving, braking or blocking the collaborative robot within the work station based on the parameters of movement and of relative orientations of the body districts that are detected by the sensors. This involves an increase in the comfort felt by the operator.

Studies and tests carried out by the Applicant has further proved that the parameters listed above, including physiological parameters aimed at determining the fatigue level of the operator and movement parameters aimed at determining the position of the operator within the work station in relation to the collaborative robot, if detected simultaneously by sensors in contact with the body of the operator, have a synergistic effect in ensuring an optimal control of the collaborative robot and of the active exoskeleton for assisting the operator in conducting his/her operations.

Naturally, without prejudice to the principle of the invention, the details of construction and the embodiments may vary widely with respect to those described and illustrated purely by way of example, without departing from the scope of the present invention, as defined by the attached claims.

What is claimed is:

1. A system for assisting an operator in a work station, the system comprising:
   at least one collaborative robot configured to assist an operator in conducting one or more operations in an open, non-protected space, adjacent to the operator and in cooperation with the operator, with a robot electronic controller associated to the at least one collaborative robot,
   at least one active exoskeleton including one or more electrically operated actuators, wearable by the operator for receiving assistance in conducting the one or more operations,
   a plurality of sensors associable to a body of the operator and configured for detecting a movement of the operator and/or relative orientation of one or more body districts of the operator,
   at least one system electronic controller configured for receiving sensor signals from said plurality of sensors and for sending control signals to said one or more actuators of the at least one active exoskeleton and to said robot electronic controller such that said at least one collaborative robot moves in a direction which avoids a collision with the operator in response to a first control signal of the control signals based on a first sensor signal of the sensor signals received from a first sensor of said plurality of sensors, the first sensor signal indicating a position of the operator to be within a threshold proximity of the at least one collaborative robot,
   wherein the at least one system electronic controller is configured and programmed for dynamically controlling:
      a functioning of said one or more actuators of the at least one active exoskeleton to control a movement of the at least one active exoskeleton via the control signals; and
      a functioning of the at least one collaborative robot as a function of the position of the operator detected by the first sensor so as to move the at least one collaborative robot via the control signals to avoid collisions or injuries between the at least one collaborative robot and the operator or conditions of lack of safety for the operator, and so as to enable the at least one collaborative robot to cooperate with the operator by conducting a first action which is complementary to a second action of the operator, the first action and the second action facilitating the conducting of an operation of the one or more operations, and the first action being different from the second action,
   wherein the at least one system electronic controller controls the movement of the at least one active exoskeleton by sending the at least one active exoskeleton a second control signal of the control signals based on a second sensor signal of the sensor signals generated by a second sensor of the plurality of sensors in response to the movement of the operator and/or the relative orientation of the one or more body districts of the operator; and
   wherein the at least one system electronic controller avoids a countermovement of the at least one active exoskeleton against the movement of the operator and/or the relative orientation of the one or more body districts of the operator in response to the first sensor signal indicating the position of the operator to be within the threshold proximity of the at least one collaborative robot.

2. The system according to claim 1, wherein at least some sensors of said plurality of sensors are associable to said at least one active exoskeleton so as to be in contact with the body of the operator, with reference to the worn condition of the at least one active exoskeleton.

3. The system according to claim 2, wherein at least some sensors of said plurality of sensors are associable to at least one body district of the operator selected from arms, legs, and a torso.

4. The system according to claim 1, wherein at least some sensors of said plurality of sensors are associable to a garment intended to be worn by the operator, and wherein the at least one active exoskeleton is worn by the operator over said garment.

5. The system according to claim 1, wherein at least some sensors of said plurality of sensors are associable directly to the body of the operator.

6. The system according to claim 1, wherein said at least one active exoskeleton comprises:
   an upper structure for the engagement of a torso of the operator and a lower structure for the engagement of legs of the operator,
   said upper structure and said lower structure being pivotally connected with each other around an axis,
   at least one elastic device operatively interposed between said upper structure and said lower structure,
   at least one electric motor operatively arranged in a series with said at least one elastic device, between said upper structure and said lower structure, and actionable by said at least one system electric controller for dynamically controlling the extent of deformation of said at least one elastic device.

7. The system according to claim 6, wherein said at least one elastic device is selected from a spiral spring and an elastic joint.

8. The system according to claim 1, wherein said at least one system electronic controller comprises an artificial neural network configured for learning movements and physical and physiological features of the operator and for consequently elaborating both signals to send to the robot electronic controller for allowing the collaborative robot to operate consistently with the movements and the physical and physiological features of the operator, both command signals for said one or more actuators of the at least one active exoskeleton.

9. The system according to claim 1, wherein, in response to the signal indicating a position of the operator to be within a threshold proximity of the collaborative robot, the at least one or more actuators avoid moving the exoskeleton against a voluntary movement of the operator.

10. The system according to claim 1, wherein at least one sensor of the plurality of sensors is configured for detecting a surface electromyography of a skin of the operator.

11. The system according to claim 1, wherein the second action is subsequent to the first action.

12. The system according to claim 1, wherein the first action comprises providing the operator with a tool, and wherein the second action comprises the operator using the tool to conduct the operation.

* * * * *